United States Patent
Smith et al.

[11] Patent Number: 6,145,179
[45] Date of Patent: Nov. 14, 2000

[54] METHOD AND APPARATUS FOR SHOCK ABSORBER REMOVAL

[75] Inventors: Richard A. Smith, Wickenburg; Darren Mauldin, Mesa, both of Ariz.

[73] Assignee: Chrysler Corporation, Auburn Hills, Mich.

[21] Appl. No.: 09/083,990

[22] Filed: May 22, 1998

[51] Int. Cl.[7] .................................................. B23P 19/04
[52] U.S. Cl. .................. 29/426.5; 29/426.6; 29/253; 29/267; 29/275
[58] Field of Search ............................... 29/426.5, 426.6, 29/239, 253, 254, 275, 227, 267; 254/104

[56] References Cited

U.S. PATENT DOCUMENTS

| | | |
|---|---|---|
| D. 108,709 | 3/1938 | Vaughan . |
| 1,400,676 | 12/1921 | Gully . |
| 1,784,033 | 12/1930 | Swanby . |
| 2,523,041 | 9/1950 | McKenzie .................................. 145/65 |
| 3,191,909 | 6/1965 | Reischl ..................... 254/104 |
| 3,916,734 | 11/1975 | Sawan .......................................... 81/56 |
| 3,935,760 | 2/1976 | Taylor .......................................... 81/55 |
| 4,073,046 | 2/1978 | Ramsden .............................. 29/401 R |
| 4,346,518 | 8/1982 | Wood ..................................... 30/272 R |
| 4,522,090 | 6/1985 | Kittle ........................................... 81/55 |
| 4,571,809 | 2/1986 | Rossow ..................................... 29/270 |
| 4,576,066 | 3/1986 | Kloster .................................... 81/176.3 |
| 4,620,360 | 11/1986 | Morris .................................... 29/566.1 |
| 4,813,118 | 3/1989 | Schmack .................................... 29/227 |
| 5,390,572 | 2/1995 | Gakhar et al. ............................ 81/436 |
| 5,455,996 | 10/1995 | Ploeger et al. ....................... 29/402.08 |
| 5,816,606 | 10/1998 | Cruise et al. ........................... 280/717 |

*Primary Examiner*—S. Thomas Hughes
*Assistant Examiner*—Essama Omgba
*Attorney, Agent, or Firm*—James R. Yee

[57] ABSTRACT

A removal device for a front shock absorber of a vehicle and method of using the same. The device comprises a first portion having first and second ends and a second portion connected to the first end of the first portion. The second portion includes a substantially rounded head and interacts with inboard and outboard surfaces of the front shock absorber to pry the absorber from the vehicle.

13 Claims, 3 Drawing Sheets

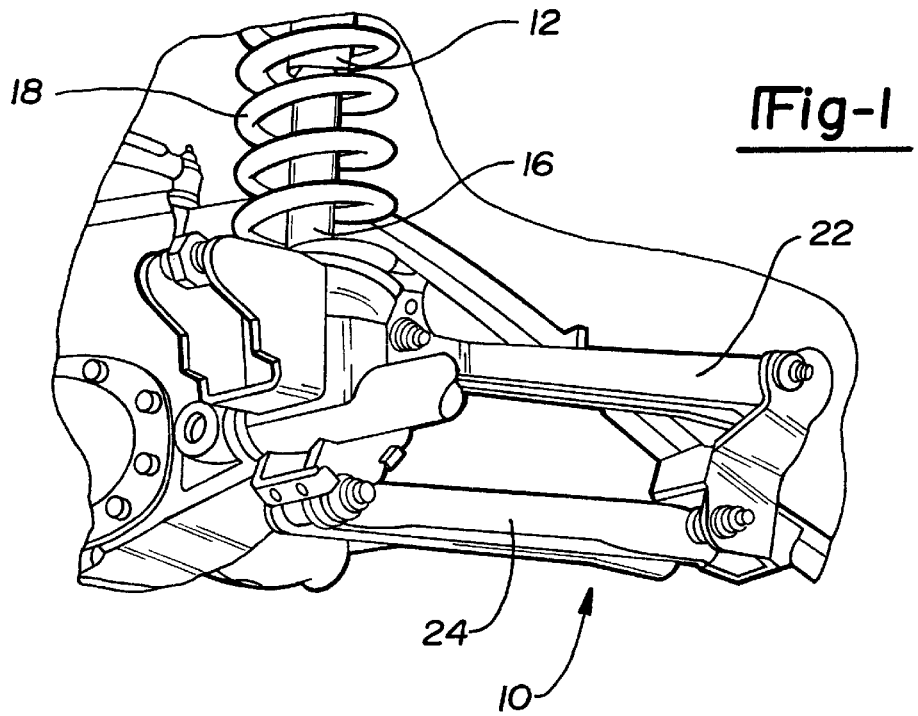
Fig-1
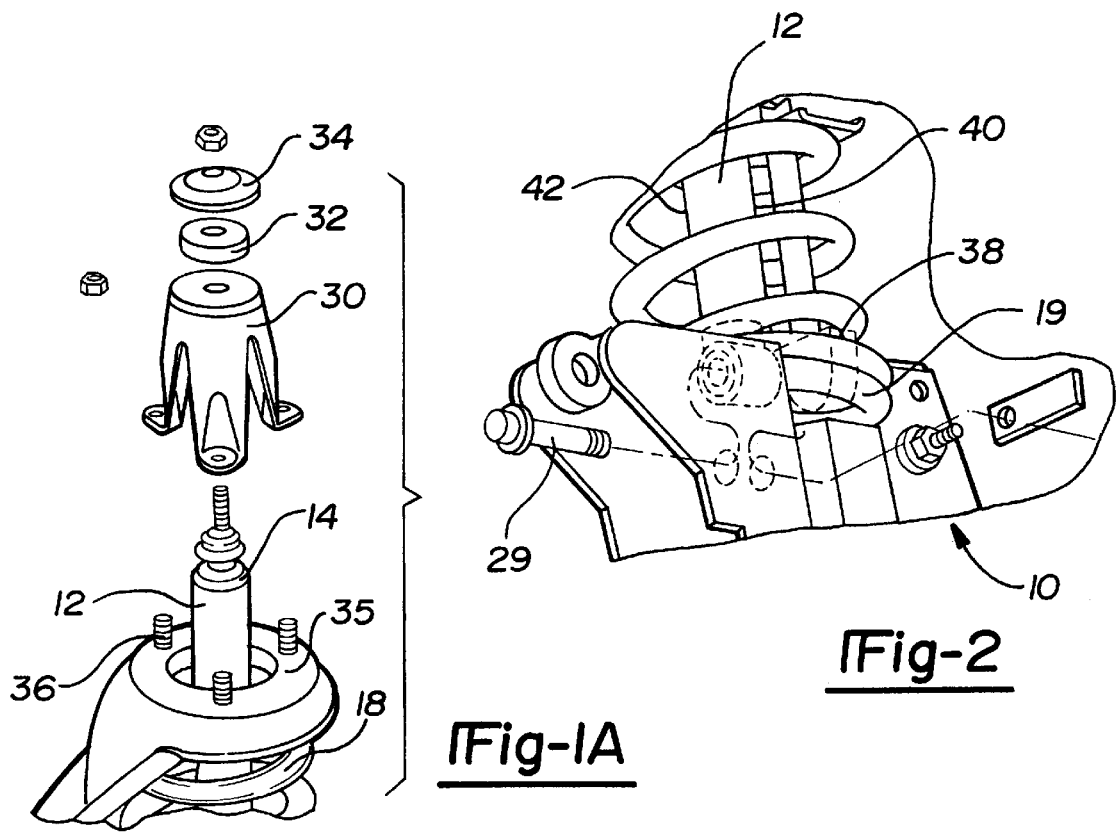
Fig-1A
Fig-2

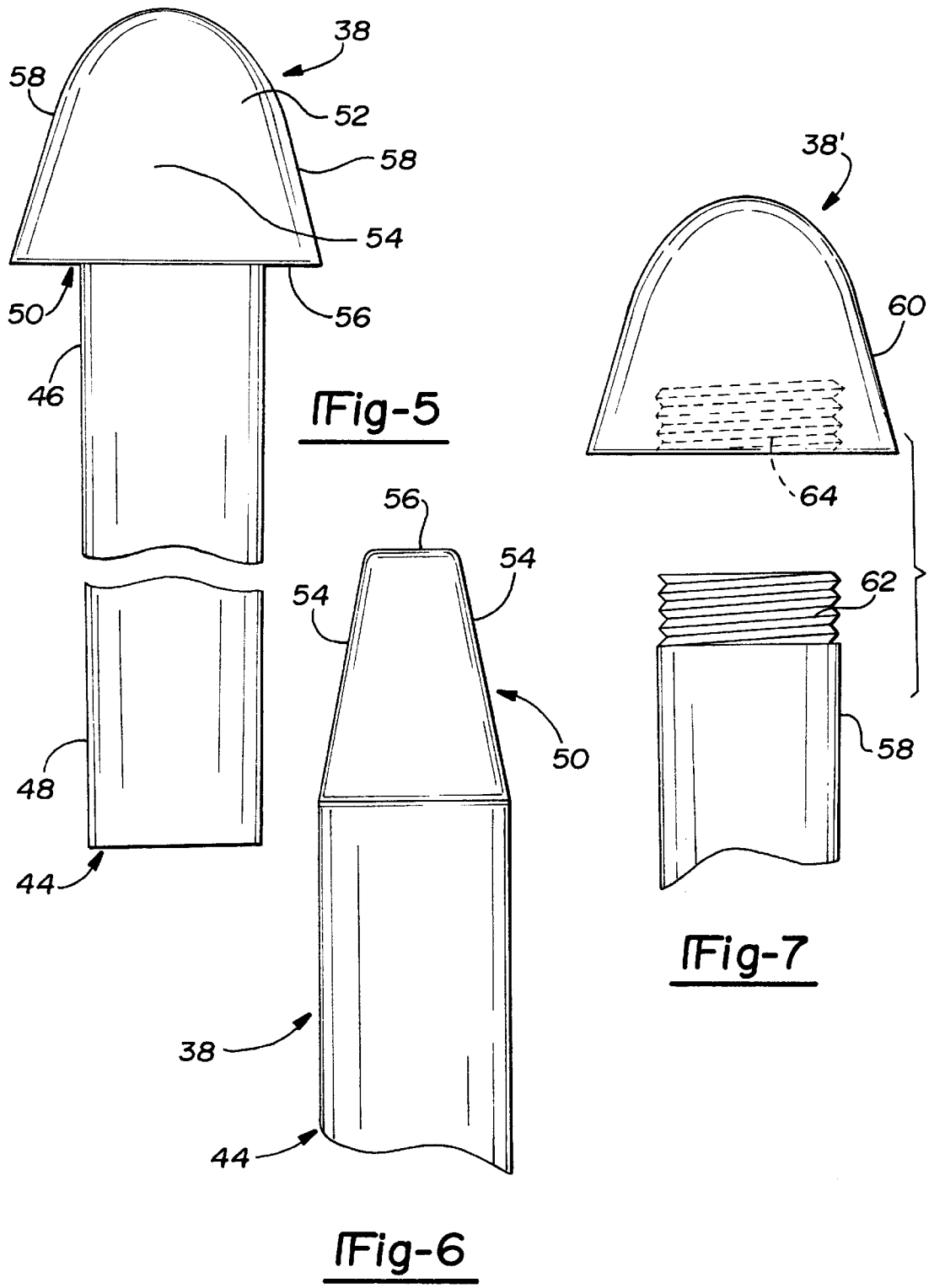

METHOD AND APPARATUS FOR SHOCK ABSORBER REMOVAL

BACKGROUND OF THE INVENTION

1. Field of the Invention

The present invention relates to motor vehicle suspensions. More particularly, the present invention relates to a method of removing a shock absorber from a motor vehicle.

2. Discussion

In a conventional manner, a clevis joint is frequently employed to secure a shock absorber (or shock) to a vehicle axle. The legs of the clevis bracket or joint cooperate to clamp the shock in place. The legs must be forcibly bent to release the shock when replacement is desired.

In many applications, the position of the shocks in relation to the suspension and axle allows for easy access with conventional hand tools to remove the shocks. The operative attachment of shock absorbers ("shocks") to certain motor vehicles makes removal of the shock absorber difficult. The arrangement of shock absorbers in the suspension of various vehicle restricts access to the shocks with conventional tools. For example, front shock absorbers for heavy duty four-wheel drive vehicles are frequently difficult to remove due to a limited working area. The use of conventional tools, such as hammers and pry bars, to remove the shocks is often difficult and time consuming, if not impossible. Thus, it is desired to provide an apparatus for removing shock absorbers in a timely and cost efficient manner within a limited working area.

SUMMARY OF THE INVENTION

The present invention provides a method and apparatus for the removal of shock absorbers incorporating an elongated member having first and second ends and a head connected to the first end of the elongated member. The head includes a substantially rounded portion for interacting with a clevis joint to pry the shock absorber from the vehicle. In a method of removal, the device is inserted into a coil spring and contacted with the clevis joint or bracket which has first and second legs which normally clamps the shock absorber. Force is applied to the device to remove the clamping engagement of the bracket and release the shock absorber.

BRIEF DESCRIPTION OF THE DRAWINGS

Additional objects and advantages of the present invention will become apparent from a reading of the following detailed description of the preferred embodiment which makes reference to the drawings of which:

FIG. 1 is a fragmented view of a shock absorber mounted in a front suspension of a motor vehicle.

FIG. 1A is an exploded view of a top portion of the front suspension of FIG. 1A.

FIG. 2 is an environmental view of an apparatus for shock absorber removal constructed in accordance with the teachings of a preferred embodiment of the present invention shown operatively associated with the front suspension of FIGS. 1A and 1.

FIG. 5 is an enlarged fragmented view of the apparatus for shock absorber removal of FIG. 2 shown removed from the front suspension for purposes of illustration.

FIG. 6 is a side view of the apparatus for shock absorber removal of FIG. 5.

FIG. 7 is an exploded view of an alternate embodiment of the apparatus for shock absorber removal.

DETAILED DESCRIPTION OF THE PREFERRED EMBODIMENT

Figure 3:
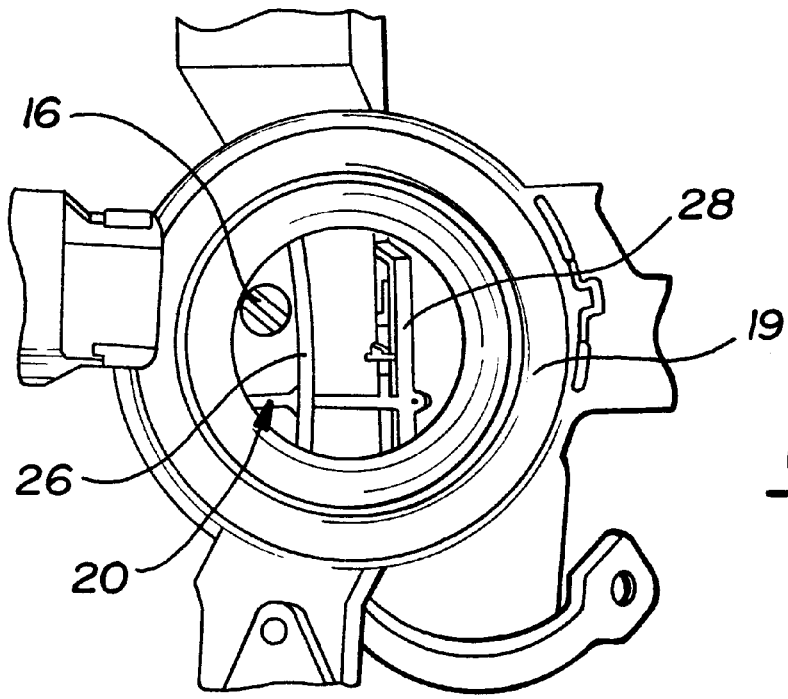
FIG. 3 is a view similar to FIG. 4 illustrating the fragmented top view of a clevis joint in its clamped position.

Before addressing the apparatus of the present invention, a brief understanding of an exemplary use environmentally is warranted. Referring first to FIGS. 1 and 1A, a portion of a front suspension 10 is shown to generally include a shock absorber 12 vertically enclosed within a coil spring 18. The suspension 10 further includes an upper suspension arm 22 and lower suspension arm 24 horizontally disposed away from the shock absorber 12. Shock absorber 12 has a first end portion 14 and second end portion 16 and is normally clamped within a clevis bracket 20 (shown most clearly in FIGS. 3 and 4) at second end 16. Clevis bracket 20 includes two legs, 26 and 28, and is mounted within a coil spring base 19.

Figure 4:
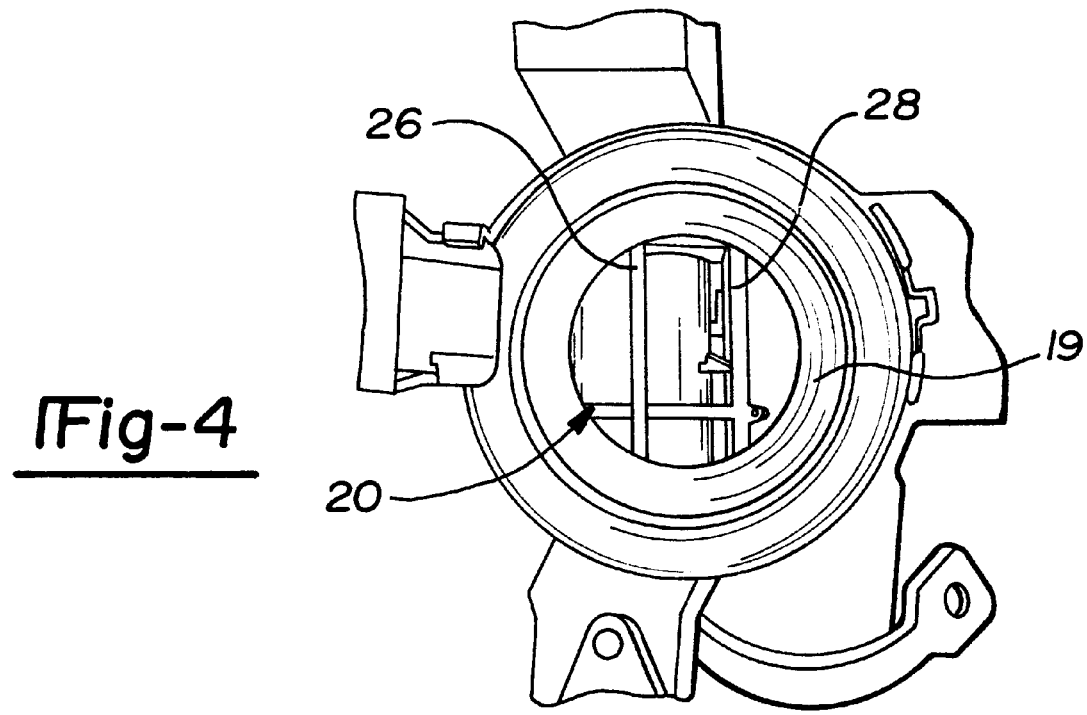
FIG. 4 is a top view of a portion of the suspension of FIGS. 1A and 1 illustrating a clevis joint in an unclamped position.

With continued reference to FIGS. 1A and 1 and additional reference to FIGS. 2–4, a fastener, such as a lower shock bolt 29, functions to retain second end 16 in a fixed mounting position. In this regard, lower shock bolt 29 inelastically deforms leg 26 of clevis joint 20 (see FIG. 4). As a result, second end 16 is effectively trapped between leg 26 and coil spring base 19, thereby clamping shock absorber 12 to front suspension 10. FIG. 3 depicts second end 16 trapped between inelastically deformed leg 26 of clevis joint 20 and coil spring base 19. FIG. 4 depicts leg 26 of clevis joint 20 returned to its original shape to allow removal of second end 16.

Upon removal of the shock bolt 29, the legs 26 and 28 continue to clamp the shock absorber 12 in its fixed position as a result of tension created in the legs 26 and 28 when the bolt 29 is tightened. As shown in FIG. 1A, first end 14 of the shock absorber 12 is enclosed by upper shock bracket 30 and connected to an engine compartment (not shown) of a vehicle by grommet 32 and retainer 34. Shock bracket 30 is mounted to the coil spring 18 by bolts 36 located on a circular top 35 of the coil spring 18. Thus, access to clevis bracket 20 located within coil spring base 19 is impeded by the construction of front suspension 10 (e.g., as shown in FIG. 1).

With continued reference to FIG. 2 and additional reference to FIGS. 5 and 6, an apparatus for shock removal constructed in accordance with the preferred embodiment of the present invention is generally identified at reference numeral 38. Apparatus 38 is shown to generally include a first portion or elongated portion 44 and a second portion or head 50. First portion 44 further includes a first end 46 and a second end 48. First portion 44 is preferably constructed of steel, but may be of any suitable material, including but not limited to a ferrous material or titanium. It will be understood that first portion 44 may be solid or hollow, but should be generally non-deformable and capable of receiving force applied with a tool, such as a hammer, in order to drive or wedge the apparatus 38.

In the preferred embodiment of the present invention, head 50 is integrally connected to first end 46 of first portion 44 to form a single body. Second portion 50 may be welded to first portion 44 or stamped in a forge to produce an integral unit. Head 50 may be any material capable of receiving a driving force, such as iron. Head 50 preferably has flat sides 54 which upwardly taper to a rounded edge 56. In side view, the head 50 is shown to include a pair of rounded sides 58.

In one exemplary embodiment, substantially flat edge 56 is preferably approximately 0.70 inches and head 50 is 1.91 inches in width. The length of head 50 is about 2.0 inches and flat sides 54 are about 4.0 inches in length. In addition, first portion 44 is approximately 27 inches in length and 1.0 inches in diameter. Although not limited to specific dimensions, the apparatus 38 must be strong enough to wedge between and spread the legs 26 and 28 of clevis bracket 20 to facilitate removal of the shock absorber 12, but small enough to avoid damaging the bracket 19. In order to accomplish this, for an embodiment where the shock absorber 12 is about 27 inches in length and 2⅜ inches in width, apparatus 38 is approximately 31 inches in length.

An alternate embodiment of the apparatus 38' of the present invention is shown depicted in FIG. 7. The embodiment depicts a first portion 58 and second portion 60 removably engageable with the first portion 58. First portion 58 has threaded means 62 for mating with second portion 60, while second portion 60 has receiving means 64. The apparatus 38' may further include a plurality of interchangeable second portions 60, ranging in size and diameter, in order to be able to employ the apparatus 38' to remove different sized shocks 12.

In the preferred method of removal of the present invention, upper bracket 30 of shock absorber 12 is detached from the engine compartment (not shown) by removing grommet 32, retainer 34 and bolts 36. Shock bolt 29 is then removed. Apparatus 38 is subsequently inserted within coil spring 18 and first inserted between first leg 26 and coil spring base 19. Flat sides 54 are preferably positioned towards outboard and inboard sides of the shock absorber 12. Through the application of an outside source to the second end 48 of first portion 44 with a conventional tool, such as a hammer, leg 26 is partially straightened to its original position. Apparatus 38 is then positioned at the inboard side of the shock 12 between second leg 28 and coil spring base 19. Again, the flat sides 54 are preferably positioned inboard and outboard. Force is applied to the apparatus 38 to complete the straightening of leg 26 (as shown in FIG. 4) and thereby release the shock 12.

While the above description constitutes the preferred embodiment of the invention, it will be appreciated that the invention is susceptible to modification, variation, and change without departing from the proper scope or fair meaning of the accompanying claims.

What is claimed is:

1. A method of removing a shock absorber of a motor vehicle circumferentially surrounded by a coil spring, the shock absorber attached to the motor vehicle through a bracket having first and second legs, comprising the steps of:

providing a removal device having first and second ends, said second end including a pair of flat sides connected by a pair of rounded sides, the flat sides upwardly tapering to a rounded edge;

inserting said removal device substantially within said coil spring;

engaging the bracket with said removal device;

releasing the bracket with said removal device by wedging the second end between the first and second legs; and releasing the shock absorbers from said vehicle.

2. The method according to claim 1, wherein said step of releasing the bracket with said removal device includes the step of applying a downwardly directed force to said first end of said removal device.

3. The method according to claim 2, wherein the step of releasing the bracket includes the step of positioning said second end of said device between the coil spring on an inboard side of the shock absorber.

4. The method according to claim 3, wherein said step of releasing the bracket includes the step of engaging an inboard side of the bracket.

5. The method according to claim 2, wherein the step of applying a downwardly directed force to said first end of said removal device includes the step of hammering said first end.

6. The method according to claim 1, wherein said step of releasing the bracket includes the step of elastically bending the first leg of the bracket.

7. A method of removing a shock absorber of a motor vehicle suspension having a coil spring surrounding the shock absorber and a clamp with first and second legs engaging the shock absorber, the method comprising the steps of:

providing a removal device having an elongated portion and a head, the head including a pair of flat sides connected by a pair of rounded sides the flat sides upwardly tapering to a rounded edge;

inserting said removal device substantially within the coil spring; and unclamping the clamp with said head of said removal device by wedging the head between the first and second legs.

8. The method according to claim 7, wherein the step of unclamping the clamp includes the step of spreading the first and second legs of the clamp.

9. The method according to claim 8, wherein the step of unclamping the clamp includes the step of applying a downwardly directed force to said elongated member.

10. The method according to claim 9, wherein the step of applying a downwardly directed force to said elongated member includes the step of hammering said elongated member.

11. The method according to claim 10, wherein the step of spreading the first and second legs of the clamp further includes the step of engaging an inboard side of the clamp.

12. The method according to claim 7, wherein the step of spreading the first and second legs of the clamp includes the step of engaging an outboard side of the clamp.

13. The method according to claim 7, wherein said step of releasing the bracket includes the step of inserting said second end of said removal tool between the first and second legs.

* * * * *